US012636785B2

(12) United States Patent　(10) Patent No.:　US 12,636,785 B2

Xu et al.　(45) Date of Patent:　May 26, 2026

---

(54) SAFETY SHARED CONTROL SYSTEM BASED ON PERFORMANCE OF TELEOPERATOR

(71) Applicant: SOUTHEAST UNIVERSITY, Jiangsu (CN)

(72) Inventors: Baoguo Xu, Jiangsu (CN); Weifeng Peng, Jiangsu (CN); Qianqian Lu, Jiangsu (CN); Aiguo Song, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 51 days.

(21) Appl. No.: 18/810,462

(22) Filed: Aug. 20, 2024

(65) Prior Publication Data

US 2025/0073907 A1　Mar. 6, 2025

Related U.S. Application Data

(63) Continuation of application No. PCT/CN2023/127227, filed on Oct. 27, 2023.

(30) Foreign Application Priority Data

Aug. 28, 2023　(CN) .......................... 202311088292.4

(51) Int. Cl.
　*B25J 9/16*　　(2006.01)
　*B25J 3/00*　　(2006.01)
(52) U.S. Cl.
　CPC .............. *B25J 9/1674* (2013.01); *B25J 3/00* (2013.01); *B25J 9/1689* (2013.01); *B25J 9/1697* (2013.01)
(58) Field of Classification Search
　USPC ................................................ 700/245–264
　See application file for complete search history.

(56) References Cited

U.S. PATENT DOCUMENTS 8,483,877 B2 *　7/2013　Abdallah ............... B25J 9/1633
　　　　　　　　　　　　　　　　　　901/45
9,272,418 B1 *　3/2016　Guerin ................... B25J 9/1661
　　　　　　　　(Continued)

FOREIGN PATENT DOCUMENTS

CN　　112828916　　5/2021
CN　　115157261　　10/2022
　　　　　　(Continued)

OTHER PUBLICATIONS

"International Search Report (Form PCT/ISA/210) of PCT/CN2023/127227," mailed on May 27, 2024, pp. 1-4.

(Continued)

*Primary Examiner* — Jonathan L Sample
(74) *Attorney, Agent, or Firm* — JCIPRNET

(57) ABSTRACT

Disclosed is a safety shared control system based on performance of teleoperator, including a master teleoperation system, a slave robotic manipulator system and a communication module; where the master teleoperation system includes EEG signal measurement of a teleoperator, hand controller operation input, and upper computer software, and the upper computer software includes a graphical user interface (GUI), safety simulation for protecting the safety of a robot, and a PoT model; and the slave robotic manipulator system includes a robotic manipulator, a vision camera and lower computer software, and the lower computer software includes a target recognition algorithm, an autonomous controller, and a shared controller for dynamically allocating human-robot control weights. A safety control system coefficient of the teleoperator is identified through safety simulation prior to actual operation, such that a safety control method for different operating experience is implemented, and safety operation of a teleoperation robot is realized.

3 Claims, 3 Drawing Sheets

(56)  References Cited

U.S. PATENT DOCUMENTS

| | | | | |
|---|---|---|---|---|
| 10,278,782 B2 * | 5/2019 | Jarc | G16H 40/67 | |
| 10,500,726 B2 * | 12/2019 | Gildert | B25J 9/1664 | |
| 11,079,897 B2 * | 8/2021 | Yerli | B25J 9/1689 | |
| 11,497,564 B2 * | 11/2022 | Dahdouh | A61B 34/35 | |
| 11,597,078 B2 * | 3/2023 | Yang | B25J 9/1612 | |
| 11,642,784 B2 * | 5/2023 | Yamane | B25J 9/1658 | |
| | | | 700/264 | |
| 2007/0073442 A1 * | 3/2007 | Aghili | B25J 9/1605 | |
| | | | 700/245 | |
| 2014/0005684 A1 * | 1/2014 | Kim | A61B 34/76 | |
| | | | 606/130 | |
| 2014/0156074 A1 * | 6/2014 | Seo | B25J 3/04 | |
| | | | 700/257 | |
| 2016/0243701 A1 * | 8/2016 | Gildert | G05B 19/42 | |
| 2017/0001301 A1 * | 1/2017 | Kamiya | B25J 9/1633 | |
| 2017/0305014 A1 * | 10/2017 | Gildert | B25J 9/161 | |
| 2021/0086364 A1 * | 3/2021 | Handa | G06V 20/56 | |
| 2023/0109398 A1 * | 4/2023 | Kranski | B25J 9/1615 | |
| | | | 700/250 | |
| 2023/0226696 A1 * | 7/2023 | Mandlekar | B25J 9/1682 | |
| | | | 700/264 | |
| 2024/0131713 A1 * | 4/2024 | Ruffaldi | B25J 13/02 | |
| 2024/0261971 A1 * | 8/2024 | Qin | B25J 9/1612 | |

FOREIGN PATENT DOCUMENTS

| | | |
|---|---|---|
| CN | 115469576 | 12/2022 |
| CN | 116330288 | 6/2023 |
| EP | 4125015 | 2/2023 |

OTHER PUBLICATIONS

"Written Opinion of the International Searching Authority (Form PCT/ISA/237) of PCT/CN2023/127227," mailed on May 27, 2024 pp. 1-3.

* cited by examiner

SAFETY SHARED CONTROL SYSTEM BASED ON PERFORMANCE OF TELEOPERATOR

CROSS-REFERENCE TO RELATED APPLICATION

This application is a continuation of PCT application No. PCT/CN2023/127227, filed on Oct. 27, 2023, which claims a priority benefit to China patent application No. 202311088292.4 filed on Aug. 28, 2023. The entirety of the above-mentioned patent applications is hereby incorporated by reference herein and made a part of this specification.

TECHNICAL FIELD

The present disclosure belongs to the technical field of robot teleoperation systems, and particularly relates to a safety shared control system based on performance of teleoperator.

BACKGROUND

A teleoperation system, as an important direction in the development of robots, allows an operator to remotely control a robot via a network, and is widely applied in scenarios inaccessible or hazardous to the human being due to a simple control method thereof. However, since operators have varying degrees of proficiency in operation, a same task performed by different operators may produce different outcomes. Furthermore, there are inevitable issues such as communication latency and data packet loss, which makes it difficult for the operators to complete delicate operations. In addition, when the robot works in an autonomous control mode, a user hopes that the robot can achieve fully automated control, that is, the robot can perceive environmental information to autonomously execute a task without human intervention, and the operator only needs to remotely supervise the operation of the robot. However, based on the current level of the automation and sensor technology, it is difficult to develop a fully autonomous robot system suitable for complex environments and capable of performing diversified tasks. Therefore, human-robot shared control has become an effective solution to solve the above problems.

For the human-robot shared control based on a teleoperation, the existing shared control methods mainly include semi-autonomous control and hybrid control. In terms of the semi-autonomous control, state variables controlled by an autonomous controller and an operator are separated, and the operator and a robot undertake different tasks, respectively. The semi-autonomous control method is simple, but is subjected to limited sharing, therefore, advantages of the operator and the robot cannot be fully leveraged. In terms of the hybrid control, the operator gives an input instruction via human-robot interaction, while an autonomous controller of the robot generates an autonomous decision-making instruction. Through an arbitration mechanism, advantages of the operator and the robot can be integrated to a greatest extent to optimize control inputs. The hybrid control method can allocate better control right to the operator and the robot based on different operational environments, but the effectiveness of the hybrid control method is greatly subjected to the arbitration mechanism. Therefore, a reasonable arbitration mechanism constitutes a key part of the shared control method. Furthermore, operators with different operating experience will directly affect the operating capabilities of the teleoperation system, and may even cause damage to the robot itself. Therefore, safety protection strategies for different operating experience should also be a crucial consideration in designing the shared control method.

SUMMARY

In order to address the above problems, the present disclosure provides a safety shared control system based on performance of teleoperator. A safety control system coefficient of the teleoperator is identified through safety simulation prior to actual operation, such that a safety control method for different operating experience is implemented, and safety operations of a teleoperation robot are realized. After prolonged operations, the dynamic update of the human-robot shared control weight based on the performance of teleopreator (PoT) is achieved by measuring the electroencephalogram (EEG) of a teleoperator, which effectively integrates human decision-making ability with robot manipulation capability, thereby enhancing the operational capacity of the teleoperation system.

In order to achieve the above objective, the present disclosure adopt the following technical solution:

a safety shared control system based on performance of teleoperator, including a master teleoperation system, a slave robotic manipulator system and a communication module;

the master teleoperation system includes EEG signal measurement of a teleoperator, hand controller operation input, and upper computer software, and the upper computer software includes a graphical user interface (GUI), safety simulation for protecting the safety of a robot, and a PoT model;

the EEG signal measurement of the teleoperator aims to obtain original EEG signals by acquiring EEG signals using an Emotiv EPOC 14-channel EEG headset;

the hand controller operation input involves a process of performing operation input to obtain an operation instruction Un of the teleoperator using a Geomagic Touch X hand controller;

the graphical user interface includes information feedback output such as slave vision, and a robot state, as well as interactive operations such as starting a task, selecting a manual/shared/autonomous mode, and ending a task; and the safety simulation is used for identifying a safety control coefficient $K_s$ of the teleoperator before actual operation of the teleoperator, with specific steps as follows:

(a) constructing a safety simulation environment, including a robotic manipulator having an end fixture, a target object, and a target position;

(b) executing a grabbing task, the teleoperator uses the hand controller to manipulate the robotic manipulator in the safety simulation environment to grasp the target object to the target position, and three operational performance indicators, operation time, path length and path smoothness, are subjected to statistics;

(c) calculating the performance of teleopreator (PoT) in the safety simulation (PoT_{SIM}), with a calculation formula as follows:

$$PoT_{SIM} = \sum W_i P_i$$

where i=1, 2, 3, $P_i$ represents an $i^{th}$ normalized operational performance indicator, and $W_i$ represents a weighting coefficient corresponding to the $i^{th}$ operational performance indicator;

(d) outputting a safety control coefficient $Ks=PoT_{SIM}$, $Ks \in [0,1]$;

the PoT model uses the EEG signals to indirectly acquire the performance of the teleoperator ($PoT_{BP}$) for a prolonged operation in real time through a backpropagation (BP) neural network model, where the neural network includes an input layer, a hidden layer and an output layer, an 14-channel EEG signal of the teleopreator is used as input, and the model outputs $PoT_{BP}$; and during the model training, data of the grabbing task in the safety simulation are adopted; and the slave robotic manipulator system includes a robotic manipulator, a vision camera and lower computer software, and the lower computer software includes a target recognition algorithm, an autonomous controller for generating an autonomous instruction of the robot, and a shared controller for dynamically allocating human-robot control weights.

The robotic manipulator is a slave body that replaces a human to perform a task in a scene inaccessible or hazardous to the human;

the vision camera provides visual information that provides feedback from a slave operation environment to a master, and is used for target recognition for the autonomous controller of the robotic manipulator; and the target recognition algorithm is used for recognizing the 3D target object in a space and obtaining a pose of the target object, recognition and positioning are performed by using a LineMod algorithm, and a process of the LineMod algorithm can be divided into a template rendering stage and an image matching stage. In the template rendering stage, RGB-D images of the target object are acquired from a plurality of angles and a plurality of scales. In the image matching stage, an offline training template and tested images are subjected to similarity measurement using a window sliding approach to determine whether the target object is detected.

The autonomous controller performs autonomous path planning according to the target object identified by the LineMod algorithm, generates an autonomous instruction Ur of the robot generates an autonomous instruction Ur of the robot, and adopts a rapidly-exploring random tree (RRT) algorithm. The algorithm takes a search starting position as a root node, and then generates a rapidly-exploring random tree by adding child nodes through random sampling, and when the child nodes of the random tree enter a target area, a path from the starting position to the target position is obtained.

The shared controller integrates the operation instruction of the teleoperator and the autonomous instruction of the robot to obtain a final shared instruction $U_c$ of the robot, a calculation thereof is divided into a safety protection period and a period after prolonged operation, where the safety protection period is based on the PoT of the safety simulation, and the period after prolonged operation is based on PoT of actual operation of the EEG signals. The specific steps are as follows:

1) the safety protection period can be calculated and obtained according to the safety control coefficient $K_s$ of the safety simulation:

$$K_h = K_s$$

2) the period after prolonged operation can be calculated and obtained according to the $PoT_{BP}$ of the PoT model:

$$K_h = \begin{cases} 1, & PoT_{BP} \geq H \\ \dfrac{PoT_{BP} - L}{H - L}, & L \leq PoT_{BP} < H \\ 0, & PoT_{BP} < L \end{cases}$$

where H and L are an upper threshold and a lower threshold of the PoT, respectively; and 3) outputting a shared control instruction:

$$U_c = K_h U_h + (1 - K_h)U_r, K_h \in [0, 1].$$

The communication module is configured to implement communication between the master teleoperation system and the slave robotic manipulator system.

The present disclosure has the beneficial effects:

1. The present disclosure identifies the safety control coefficient of the teleoperator through the safety simulation before the actual operation, and realizes the safety control method under different operation experience, such that safe operation of the teleoperation robot under different operation experience can be protected.

2. The present disclosure adopts the EEG signals of the teleoperator to monitor the PoT during the prolonged operation in real time, effectively arbitrates the control weight of the teleoperator based on the PoT, and realizes dynamic update of the human-robot shared control weight, such that the human decision-making ability with robot manipulation capability are effectively integrated, and the operational capacity of the teleoperation system is enhanced.

DETAILED DESCRIPTIONS OF THE EMBODIMENTS

The present disclosure will be further illustrated below with reference to the accompanying drawings and specific embodiments. It should be understood that the following specific embodiments are only used to illustrate the present disclosure, but are not intended to limit the scope of the present disclosure.

Figure 1:
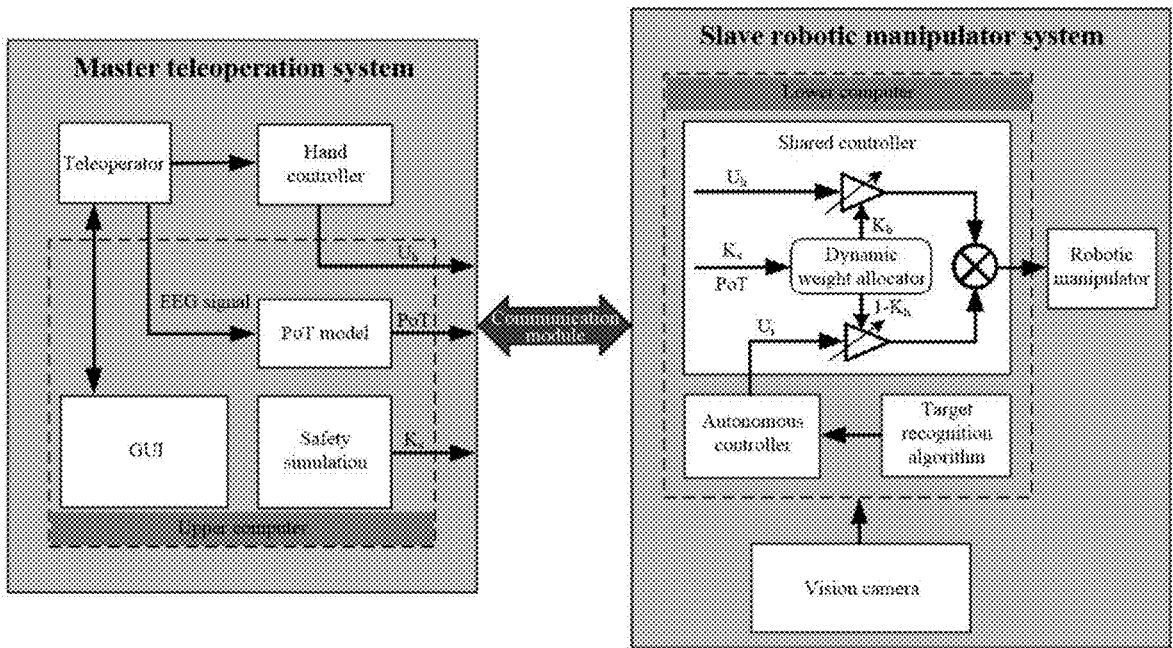
FIG. 1 is an overall block diagram of a safety shared control system based on performance of teleoperator.

This embodiment provides a safety shared control system based on performance of teleoperator, including a master teleoperation system and a slave robotic manipulator system, and an overall framework of the system is shown in FIG. 1. In the present disclosure, a graphical user interface (GUI) will be served as an interaction interface between a teleoperator and a robot, and is configured to display slave visual information, robot state information and safety simulation environment information, and to perform task interaction, such as starting a task, selecting a manual/shared/ autonomous mode, and ending a task. The specific implementation includes the following steps: Step (1) before the actual operation is performed, the teleoperator executes a target object grabbing task in the safety simulation through a hand controller to identify a safety control coefficient of the teleoperator, and the safety control coefficient will be used for allocating a control weight of the teleoperator in a dynamic weight allocator; Step (2) after the safety simulation is completed, the teleoperator inputs an operation instruction through the hand controller, controls actual operation of the slave robotic manipulator under the safety control coefficient, send back visual feedback from slave operation environment information through visual feedback to a master for displaying, a lower computer also performs target recognition according to visual information provided by a camera, an autonomous controller completes trajectory planning to generate an autonomous instruction for the robot, and a shared controller then shares and integrates the operation instruction and the autonomous instruction based on the control weight; and Step (3) after prolonged operation is performed, an electroencephalogram (EEG) signal is inputted into a performance of teleopreator (PoT) model in an upper computer, the PoT of the teleoperator is calculated through the PoT model, and calculation results are sent to the dynamic weight allocator at a slave, dynamic update of a shared control weight based on PoT is implemented, and the shared control weight of the teleoperator for the prolonged operation is updated.

Figure 2:
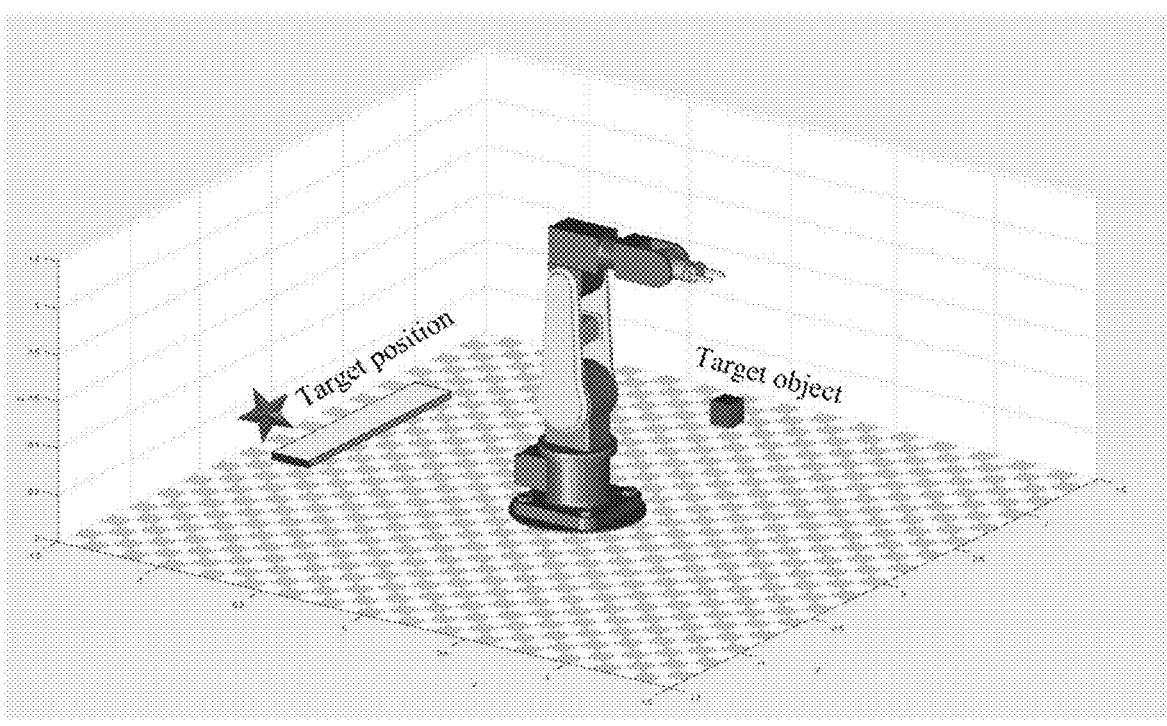
FIG. 2 is a safety simulation environment diagram.

Step (1) confirming safety control coefficient through safety simulation:

Before the actual operation, safety simulation is performed to ensure the safety of the robot, for different teleoperators have different degrees of proficiency in the teleoperation system, and the safety control coefficient $K_s$ before the actual operation by the teleoperator is obtained, specifically, Step (1) includes:

(a) constructing a safety simulation environment, as shown in FIG. 2, by using Matlab, including a robotic manipulator having an end fixture, a target object, and a target position;

(b) executing the grabbing task, the teleoperator uses the hand controller to manipulate the robotic manipulator in the safety simulation environment to grasp the target object to the target position, and three operational performance indicators, operation time, path length and path smoothness, are subjected to statistics;

(c) calculating the performance of teleopreator (PoT) in the safety simulation ($PoT_{SIM}$), with a calculation formula as follows:

$$PoT_{SIM} = \sum W_i P_i$$

where i=1, 2, 3, $P_i$ represents an $i^{th}$ normalized operational performance indicator, and $W_i$ represents a weighting coefficient corresponding to the $i^{th}$ operational performance indicator; and (d) outputting a safety control coefficient $K_s = PoT_{SIM}$, $K_s \in [0,1]$.

Figure 3:
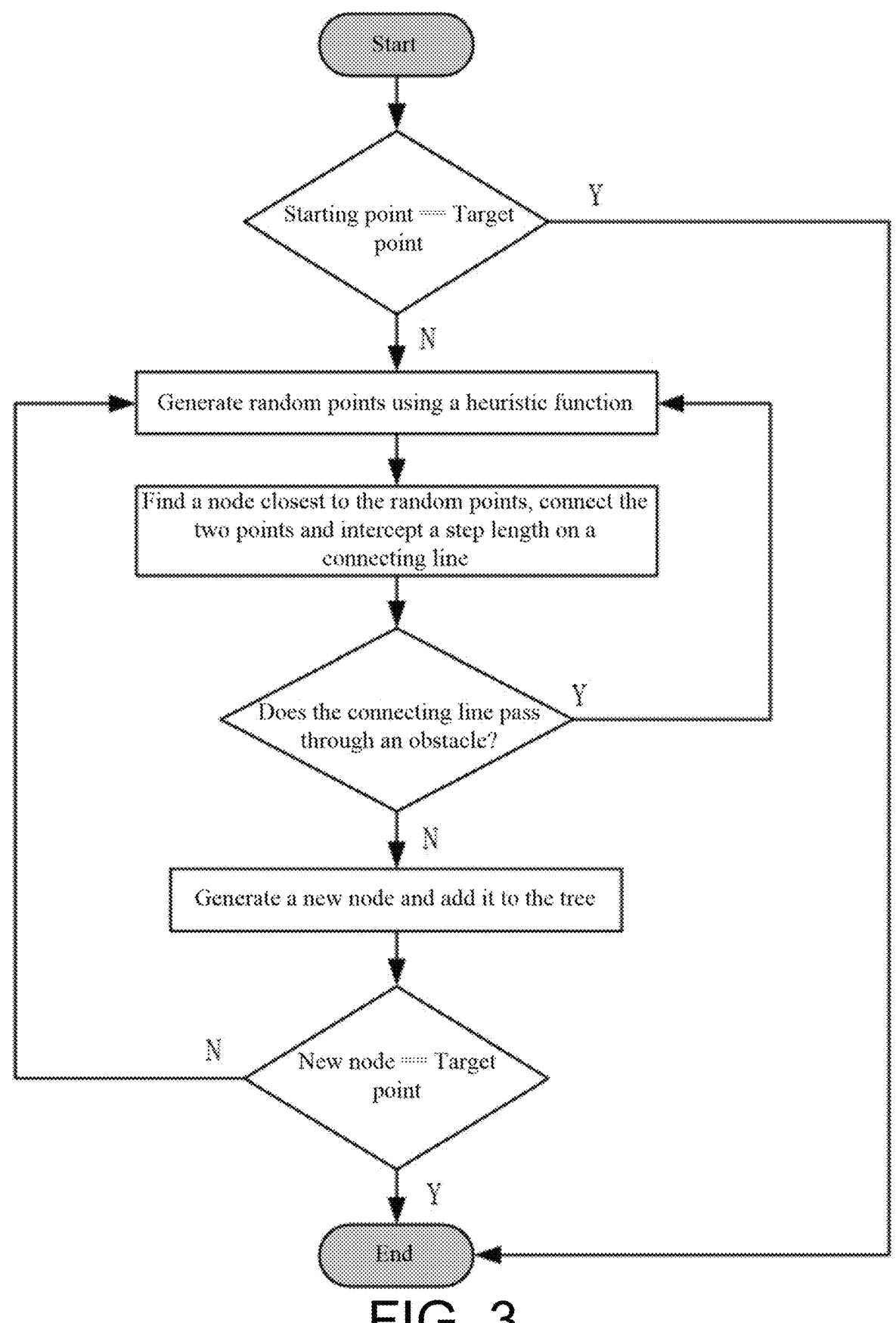
FIG. 3 is a flow chart of an RRT algorithm.

Step (2) performing shared control in the actual operation:

In the actual operation, an input instruction of the robot includes two parts, an operation instruction $U_h$ of the teleoperator and an autonomous instruction $U_r$ of the robot, where the operation instruction comes from the input of the hand control of the master, and the autonomous instruction is a result of path planning performed by the autonomous controller according to the target recognition result. Specifically, Step (2) includes:

(a) recognizing the 3D target object in a space by using a LineMod algorithm and obtaining a pose of the target object, and a process of the LineMod algorithm can be divided into a template rendering stage and an image matching stage. In the template rendering stage, RGB-D images of the target object are acquired from a plurality of angles and a plurality of scales; and in the image matching stage, an offline training template and tested images are subjected to similarity measurement using a window sliding approach to determine whether the target object is detected;

(b) adopting an RRT algorithm to perform path planning and generate an autonomous instruction, with the algorithm flow shown in FIG. 3;

(c) sharing and integrating the operation instruction and the autonomous instruction as follows:

$$U_c = K_s U_h + (1 - K_s)U_r, K_s \in [0, 1].$$

Figure 4:
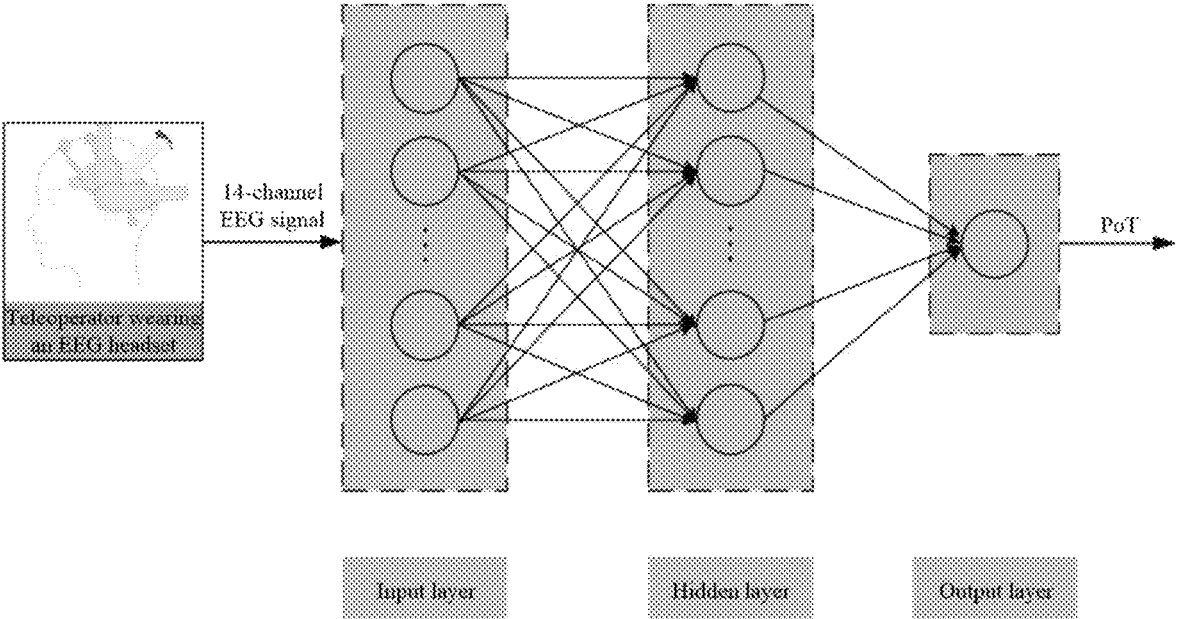
FIG. 4 is a schematic diagram of a PoT model based on a BP neural network.

Step (3) after the prolonged operation, implementing dynamic update of the shared control weight based on the PoT:

after the prolonged operation is performed, the operation experience and the operation state of the teleoperator will change to some extent, therefore, it is necessary to further evaluate changes in the PoT of the teleoperator online to dynamically update the human-robot shared control weight. EEG signals are acquired by using an Emotiv EPOC 14-channel EEG headset to obtain 14-channel EEG signals, the PoT is modeled by using a BP neural network, the model is shown in FIG. 4, and specifically, Step (3) includes:

(a) acquiring EEG signals: EEG signals are acquired by using the Emotiv EPOC 14-channel EEG headset to obtain the 14-channel EEG signals, signal filtering and feature extraction are performed by using a software development kit (SDK) provided by Emotiv to obtain the 14-channel EEG signals required by the PoT model; and (b) molding a BP neural network, which includes an input layer, a hidden layer, and an output layer, the teleoperator takes the 14-channel EEG signals as inputs, the hidden layer adopts an activation function to implement nonlinear transformation of data, and data of the output layer is derived from the grabbing task executed in the safety simulation.

When calculating neuron transmission of each layer:

$$A_i^j = \sum_k W_{ik}^j A_k^{j-1} + B_i^j$$

where $$A_i^j \text{ and } B_i^j$$

are excitation and bias of a $j^{th}$ neuron in an $i^{th}$ layer, and $$W_{ik}^j$$

is a weight from a $k^{th}$ neuron in a $j-1^{th}$ layer to an $i^{th}$ neuron in a $j^{th}$ layer. A cost function of the output layer is as follows:

$$E = \frac{1}{2}\sum(PoT - PoT^*) \qquad 5$$

where PoT and PoT* are an actual output and an expected output of the output layer, respectively. A weight update function is as follows:

$$W^{i+1} = W^i - \eta\frac{\partial E}{\partial W}\Big|_{W=W_i} = W^i + \eta\delta_i O_k$$

where t is a number of iterations, $\eta$ is a learning rate of the BP neural network, $\delta_i$ a learning error of an $i^{th}$ neuron of a current layer, and $O_k$ is an output of a $k^{th}$ neuron on an upper layer. An output $PoT_{BP}$ of the neural network is as follows:

$$PoT_{BP} = f_n(x_p)$$

where $x_p$ is a 14-channel EEG signal vector, and $f_n$ is a trained neural network model.

(c) A shared control weight $K_h$ based on the PoT is calculated $$K_h = \begin{cases} 1, & PoT_{BP} \geq H \\ \dfrac{PoT_{BP} - L}{H - L}, & L \leq PoT_{BP} < H \\ 0, & PoT_{BP} < L \end{cases}$$

where H and L are an upper threshold and a lower threshold of the PoT, respectively, as follows:

(i) when $K_h=0$, that is, the PoT is poor and is lower than the lower threshold, the operation mode is the autonomous control mode, the output instruction of the shared controller is the autonomous instruction of the robotic manipulator, in which case, the teleoperator does not participate in the control of the robotic manipulator, and the robotic manipulator performs autonomous control according to the visual information;

(ii) when $0<K_h<1$, that is, the PoT is good and falls within the upper threshold and the lower threshold, the operation mode is the human-robot shared control mode, and the output instruction of the shared controller is the shared integration of the operation instruction of the teleoperator and the autonomous instruction of the robotic manipulator. In this mode, when $K_h=0.5$ the teleoperator and the robotic manipulator each account for half of the control weight. As the $K_h$ value continues to increase, the control weight of the teleoperator is continuously increased; and (iii) when $K_h=1$, that is, the PoT is excellent and is higher than the upper threshold, the operation mode is the manual control mode, the output instruction of the shared controller is the operation instruction of the teleoperator, in which case, the robotic manipulator is completely controlled by the teleoperator, that is, the teleoperator controls the robotic manipulator through the hand controller.

(d) Sharing and integrating the operation instruction and the autonomous instruction as follows:

$$U_c = K_h U_h + (1 - K_h)U_r, K_h \in [0, 1]$$

(e) The robotic manipulator receives a shared control instruction $U_e$ and reaches the final target location.

It should be noted that the above content merely illustrates the technical idea of the present disclosure and cannot limit the protection scope of the present disclosure, those ordinarily skilled in the art may also make some modifications and improvements without departing from the principle of the present disclosure, and these modifications and improvements should also fall within the protection scope of the claims of the present disclosure.

What is claimed is:

1. A safety shared control system based on performance of teleoperator, comprising a master teleoperation system, a slave robotic manipulator system and a communication module;

the master teleoperation system comprises EEG signal measurement device of a teleoperator, hand controller operation input, and upper computer software, wherein the upper computer software comprises a graphical user interface (GUI), safety simulation for protecting the safety of a robot, and a performance of teleoprator (PoT) model;

the slave robotic manipulator system comprises a robotic manipulator, a vision camera and lower computer software, wherein the lower computer software comprises a target recognition algorithm, an autonomous controller for generating an autonomous instruction of the robot, and a shared controller for dynamically allocating human-robot control weights; and the communication module is configured to implement communication between the master teleoperation system and the slave robotic manipulator system, wherein the EEG signal measurement device of the teleoperator in the master teleoperation system aims to obtain original EEG signals by acquiring EEG signals using an Emotiv EPOC 14-channel EEG headset;

the hand controller operation input involves a process of performing operation input to obtain an operation instruction $U_h$ of the teleoperator using a Geomagic Touch X hand controller;

the graphical user interface comprises information feedback output, and a robot state, as well as interactive operations, selecting a manual/shared/autonomous mode, and ending a task; and the safety simulation is used for identifying a safety control coefficient $K_s$ of the teleoperator before actual operation of the teleoperator, with specific steps as follows:

(a) constructing a safety simulation environment, comprising a robotic manipulator having an end fixture, a target object, and a target position;

(b) executing a grabbing task, wherein the teleoperator uses the hand controller to manipulate the robotic manipulator in the safety simulation environment to grasp the target object to the target position;

(c) calculating the performance of teleopreator (PoT) in the safety simulation ($PoT_{SIM}$), with a calculation formula as follows:

$$PoT_{SIM} = \sum W_i P_i,$$

in the formula, i=1, 2, 3, $P_i$ represents an $i^{th}$ normalized operational performance indicator, and $W_i$ represents a weighting coefficient corresponding to the $i^{th}$ operational performance indicator; and (d) outputting a safety control coefficient $K_s = PoT_{SIM}$, $K_s \in [0,1]$;

the PoT model uses the EEG signals to indirectly acquire the performance of teleoperator ($PoT_{BP}$) for a prolonged operation through a backpropagation (BP) neural network model, wherein the BP neural network comprises an input layer, a hidden layer and an output layer, an 14-channel EEG signal of the teleopreator is used as input, and the model outputs $PoT_{BP}$; and during the model training, data of the grabbing task in the safety simulation are adopted.

2. The safety shared control system based on performance of teleoperator according to claim 1, wherein the robotic manipulator in the slave robotic manipulator system is a slave body that replaces a human to perform a task in a scene inaccessible or hazardous to the human;

the vision camera provides visual information that provides feedback from a slave operation environment to a master, and is used for target recognition for the autonomous controller of the robotic manipulator;

the target recognition algorithm is used for recognizing the target object (3D) in a space and obtaining a pose of the target object, recognition and positioning are performed by using a LineMod algorithm, and a process of the LineMod algorithm is divided into a template rendering stage and an image matching stage; in the template rendering stage, RGB-D images of the target object are acquired from a plurality of angles and a plurality of scales; and in the image matching stage, an offline training template and tested images are subjected to similarity measurement using a window sliding approach to determine whether the target object is detected;

the autonomous controller performs an autonomous path based on the target recognition results and generates the autonomous instruction Ur of the robot, and adopts a rapidly-exploring random tree algorithm, which takes a search starting position as a root node, and then generates a rapidly-exploring random tree by adding child nodes through random sampling, and when the child nodes of the random tree enter a target area, a path from the starting position to the target position is obtained; and the shared controller integrates the operation instruction of the teleoperator and the autonomous instruction of the robot to obtain a final shared instruction $U_c$ of the robot, and the calculation thereof is divided into a safety protection period and a period after prolonged operation, wherein the safety protection period is based on the PoT of the safety simulation, and the period after prolonged operation is based on the PoT of actual operation of the EEG signals, with specific steps as follows:

1) The safety protection period are calculated and obtained according to the safety control coefficient $K_s$ of the safety simulation:

$$K_h = K_s$$

2) the period after prolonged operation are calculated and obtained according to the $PoT_{BP}$; of the PoT model:

$$K_h = \begin{cases} 1, & PoT_{BP} \geq H \\ \dfrac{PoT_{BP} - L}{H - L}, & L \leq PoT_{BP} < H \\ 0, & PoT_{BP} < L \end{cases}$$

in the formula, H and L are an upper threshold and a lower threshold of the PoT, respectively; and 3) a shared control instruction is calculated and output, wherein a formula of the shared control instruction is as follows:

$$U_c = K_h U_h + (1 - K_h) U_r, K_h \in [0, 1],$$

in the formula, $U_c$ represents the shared control instruction, $U_h$ represents the operation instruction, $U_r$ represents the autonomous instruction $K_h$ represents a shared control weight.

3. The safety shared control system based on performance of teleoperator according to claim 1, wherein specific implementation of the safety shared control system comprises the following steps:

(1) before the actual operation is performed, the teleoperator executes the target object grabbing task in the safety simulation through the hand controller to identify the safety control coefficient of the teleoperator, and the safety control coefficient will be used for allocating a control weight of the teleoperator in a dynamic weight allocator;

(2) after the safety simulation is completed, the teleoperator inputs the operation instruction through the hand controller, controls actual operation of the slave robotic manipulator under the safety control coefficient, send back visual feedback from slave operation environment information through visual feedback to a master for displaying, a lower computer also performs target recognition according to visual information provided by a camera, the autonomous controller completes trajectory planning to generate the autonomous instruction for the robot, and the shared controller then shares and integrates the operation instruction and the autonomous instruction based on the control weight; and (3) after prolonged operation is performed, an electroencephalogram (EEG) signal is inputted into the performance of teleopreator (PoT) model in an upper computer, PoT of the teleoperator is calculated through the PoT, calculation results are sent to the dynamic weight allocator at the slave, dynamic update of a shared control weight based on PoT is implemented, and the shared control weight of the teleoperator for the prolonged operation is updated.

\* \* \* \* \*